United States Patent Office 2,796,556
Patented June 18, 1957

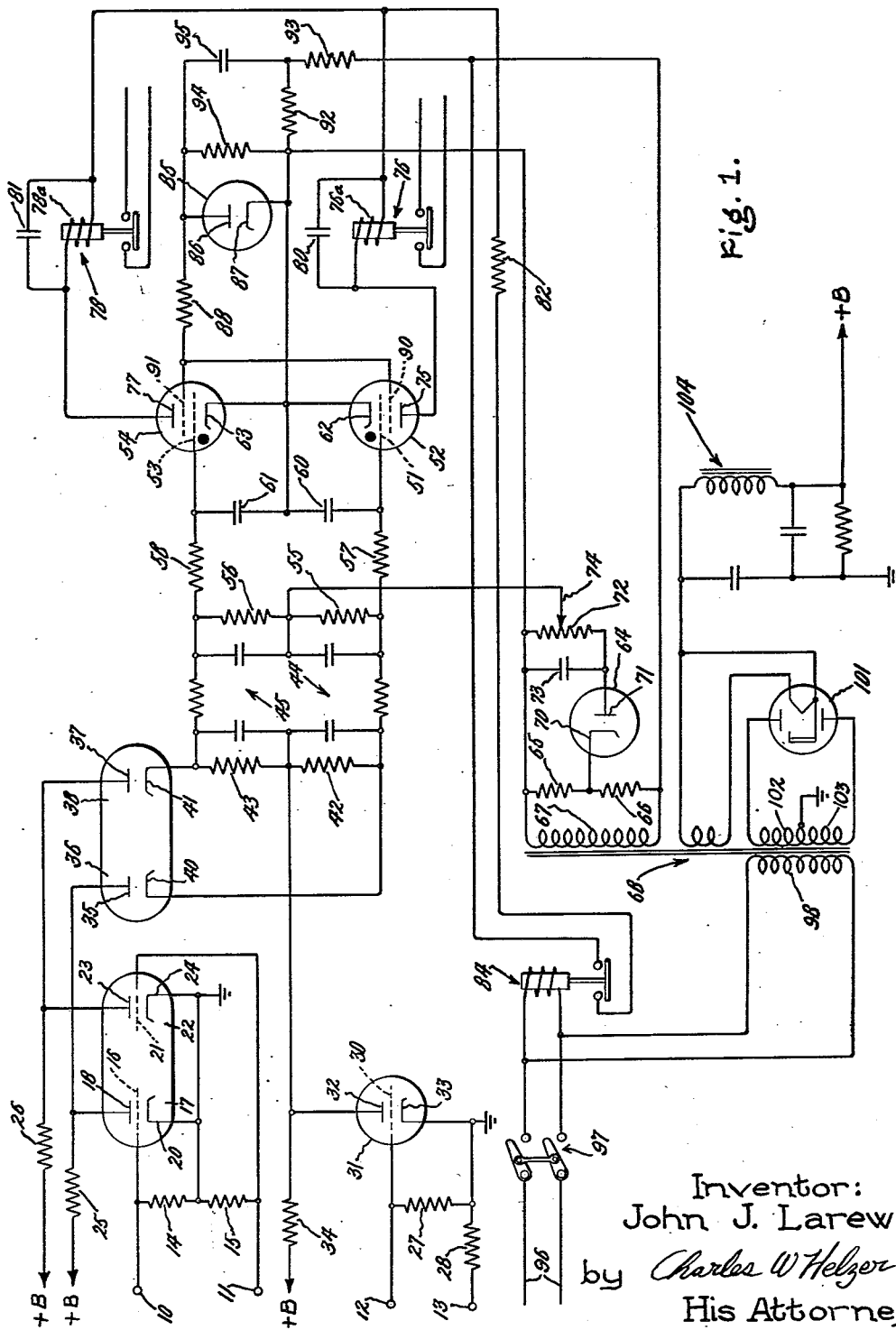

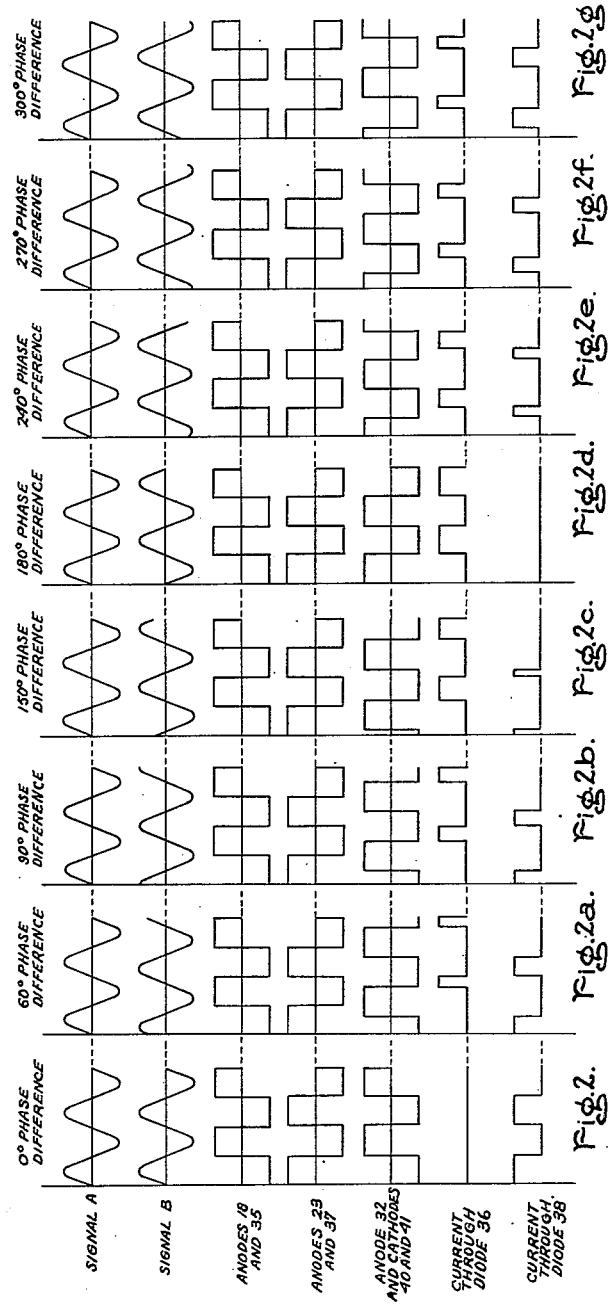

2,796,556
PHASE COMPARATOR

John J. Larew, Scotia, N. Y., assignor to General Electric Company, a corporation of New York Application November 30, 1953, Serial No. 395,118

7 Claims. (Cl. 315—166)

This invention pertains to phase comparators. More particularly, the invention relates to a novel phase comparator wherein the phases of two input signals are compared, and if there is a phase difference other than a reference value between the input signals, current is caused to flow in one of two output circuits, depending upon whether the phase difference is greater than or less than the reference value.

Phase comparators which compare the phases of two input signals and when the phases of the signals do not agree, actuate relays or other devices to correct the condition, are well-known in the art. Heretofore, however, such devices have been electro-mechanical in character, and have frequently not embodied the accuracy required in modern computing and control applications. Therefore, a primary object of the present invention is to provide a phase comparator which will compare the phases of two input signals with great accuracy, and will cause current to flow in one of two output circuits, depending upon whether the phase difference between the two input signals is greater than or less than a reference value.

Another object of the invention is to provide such a comparator having an adjustable "dead-band"; that is, a comparator in which the amount of phase difference allowed between the two input signals before current flows through one of the output circuits may be adjusted.

A further object of the invention is to provide such a device, which is essentially electronic in character, and includes a minimum of mechanical components.

A phase comparator constructed in accordance with the invention comprises square wave converting means, which may include electronic means in each of the input channels of the two alternating current signals, whose phases are to be compared, for converting the input signals substantially into square waves. The square waves are then fed into a phase comparison circuit, which serves to provide two D. C. output voltages, whose relative amplitudes are dependent on the phase difference and direction of phase difference between the input signals. The D. C. signals are then utilized to control the current flow through a pair of electron discharge devices, in whose output circuits are connected the devices, which it is desired to energize. The circuit is so arranged that both of the electron discharge devices cannot conduct simultaneously, and this simultaneous energization of the devices in their output circuits is prevented.

For a better understanding of the invention, reference is made to the following description taken in conjunction with the accompanying drawings of one embodiment of the invention, in which Fig. 1 is a schematic circuit diagram of one form of the invention; and Figs. 2, 2a, 2b, 2c, 2d, 2e, 2f and 2g are diagrams showing various voltage and current relationships throughout the circuit, when the two input signals are phase displaced by zero degrees, 60°, 90°, 150°, 180°, 240°, 270° and 300°, respectively.

Referring now to Fig. 1, the signals, whose phases are to be compared, may be connected between input terminals 10 and 11 and between input terminals 12 and 13, respectively, and that signal connected between terminals 10 and 11 will be hereafter referred to as signal "A," while that signal connected between terminals 12 and 13 will be hereafter referred to as signal "B."

Signal A, which is connected between terminals 10 and 11, appears across resistors 14 and 15, which are connected in series between terminals 10 and 11 and are of equal value. The juncture of resistors 14 and 15 is grounded, and it is apparent that the signals appearing across these resistors will be of equal amplitude but of opposite polarity. The signal appearing across resistor 14 is connected to the control grid 16 of a triode electron discharge device 17, having an anode 18 and a cathode 20. The signal appearing across resistor 15 is similarly connected to the control grid 21 of a triode electron discharge device 22, having an anode 23 and a cathode 24. The cathodes 20 and 24 of the two discharge devices are connected together and grounded, and anodes 18 and 23 are connected through resistors 25 and 26, respectively, to a +B anode supply voltage source, which will be later described in more detail. The discharge devices 17 and 22 serve as limiters and are operated at zero bias, so that when signal A, which is essentially a sine wave, is supplied to the control grids thereof, the signal appearing on anodes 18 and 23 of the discharge devices will be essentially square waves of equal amplitude but opposite polarity.

Input signal B, which is connected between terminals 12 and 13, appears across resistors 27 and 28, which are connected in series between terminals 12 and 13. The juncture of resistors 27 and 28 is grounded, and the signal appearing across resistor 27 is connected to the control grid 30 of a triode electron discharge device 31, which has an anode 32 and a cathode 33. Anode 32 is connected to the +B supply through a conventional anode resistor 34 and the bias supplied to discharge device 31 is adjusted so that the device serves as a limiter in the same manner as discharge devices 17 and 22 previously discussed.

Returning a gain to the square waves of opposite polarity appearing on anodes 18 and 23 of discharge devices 17 and 22, anode 18 of discharge device 17 is connected to the anode 35 of a diode electron discharge device 36, and the signal appearing on anode 23 of discharge device 22 is connected to the anode 37 of a diode electron discharge device 38. Electron discharge devices 36 and 38 have the cathodes 40 and 41 thereof connected together through a pair of resistors 42 and 43 of equal value and comprise a phase comparison means. For this purpose, the square wave signal appearing on anode 32 of electron discharge device 31 in the signal B input circuit is connected to the juncture of resistors 42 and 43. It is apparent that diode discharge device 36 will conduct only when the signal appearing on its anode 35 is positive with respect to the signal appearing on its cathode 40, and diode discharge device 38 will conduct only when its anode 37 is positive with respect to its cathode 41. Because the signals appearing on control grids 16 and 21 of discharge devices 17 and 22 are of opposite polarity, and, consequently, the signals appearing on anodes 35 and 37 of discharge devices 36 and 38 are of opposite polarity, it is apparent that discharge devices 36 and 38 cannot conduct simultaneously, but may conduct during alternate half-cycles of input signal A, if their cathodes are of proper polarity to allow conduction at these times. The polarity of cathodes 40 and 41 depends, of course, on input signal B, and, whether this signal is so related in polarity to input signal A as to allow diode discharge devices 36 and 38 to conduct, depends upon the phase difference between the two signals.

If it is assumed that the phase relationship between signals A and B is such that diode 36 conducts during a portion of each alternate half-cycle, and diode 38 conducts for an equal portion of the other alternate half-cycles, equal D. C. signals will appear across resistors 42 and 43. The D. C. signals appearing across resistors 42 and 43 are filtered by conventional filters 44 and 45, respectively, whose outputs are two D. C. voltages, whose relative amplitudes depend on the relative lengths of the conduction periods of diode discharge devices 36 and 38 during alternate half-cycles of input signal A.

The filtered D. C. output of diode discharge device 36 is coupled to the control grid 51 of a gas discharge device 52, and the filtered D. C. output of diode discharge device 38 is similarly connected to control grid 53 of a similar gas discharge device 54. The signals appear across resistors 55 and 56, which serve as grid resistors for discharge devices 52 and 54, respectively, and are coupled to control grids 51 and 53 through the usual current-limiting resistors 57 and 58, respectively. Control grids 51 and 53 are connected together through capacitors 60 and 61, which serve susbtantially to prevent A. C. signals from appearing on the control grids, and the juncture of capacitors 60 and 61 is connected to the cathodes 62 and 63.

Negative bias is provided on control grids 51 and 53 by a circuit which comprises a conventionally-connected diode rectifier 64 having the cathode thereof connected to the juncture of a pair of load resistors 65 and 66 that are in turn connected in series across a secondary winding 67 of a power transformer 68. The anode 71 of diode 64 is connected to provide a half-wave rectified D. C. voltage across a potentiometer 72, connected in parallel with a capacitor 73, and the movable pick-off contact arm 74 of potentiometer 72 is connected to the juncture of resistors 55 and 56 in the control grid circuits of electron discharge devices 52 and 54. Cathodes 62 and 63 of electron discharge devices 52 and 54 are also connected through potentiometer 72 to the juncture of resistors 55 and 56. Therefore, if there is a difference between the filtered D. C. outputs of diode discharge devices 36 and 38, one of the control grids of electron discharge devices 52 and 54 will be negative with respect to the common cathode connection, while the other is positive.

The anodes of discharge devices 52 and 54 are supplied with alternating current, and the devices, which are to be actuated by a phase difference, other than a reference value of phase difference, between the input signals, are connected in the anode-cathode circuits of these discharge devices. In this case, the operating winding 76a of a relay 76 is connected in the anode circuit of discharge device 52, and the operating winding 78a of a second relay 78 is connected in the anode circuit of discharge device 54. It is to be understood, however, that devices other than relay operating windings may be connected in the anode circuits or in the cathode circuits, as desired, of the discharge devices 52 and 54. The relay operating windings 76a and 78a are connected in parallel with capacitors 80 and 81, respectively, whose function will be later described. Anodes 75 and 77 are connected through a resistor 82 and through the contacts of a time delay relay 84, to the end of transformer secondary winding 67 remote from that to the end of transformer secondary winding 67 remote from that to which the cathodes 62 and 63 are connected.

The output circuit thus far described is now seen to comprise a pair of electron discharge devices 52 and 54 connected in parallel across secondary winding 67 of transformer 68, and the input circuits provide signals on the control grids of the discharge devices, which may be of opposite polarity with respect to the common cathode connection. The signals appearing n the control grids of the electron discharge devices have been reasonably well filtered. However, in order to have fast response throughout the circuit, some ripple must appear on the control grids 51 and 53 of the gas-filled electron discharge devices. If this ripple is completely removed, it is possible that unstable operation may result under certain conditions. To prevent such operation and to assure positive firing of the gas-filled discharge devices, a novel circuit is provided which prevents the discharge devices from firing except at approximately the peak values of their anode voltages.

The operation of this portion of the circuit is based upon the fact that the shield grids of gas-filled electron discharge devices are quite effective in preventing the discharge devices from firing, when the shield grids are negative with respect to the cathodes. The circuit comprises an electron discharge device 85 of the diode type having an anode 86 and a cathode 87, with the anode 86 connected through resistor 88 to shield grids 90 and 91 of the gas-filled electron discharge devices 52 and 54, respectively. Cathode 87 of diode 85 is connected to the common cathode connection of cathodes 62 and 63 of discharge devices 52 and 54, and is also connected through series-connected resistors 92 and 93 to the anode supply voltage of discharge devices 52 and 54. A resistor 94, having a large value relative to resistors 92 and 93, is connected across diode 85, and a capacitor 95 is connected from anode 86 to the juncture of resistors 92 and 93. Thus, the circuit comprising resistors 92 and 94 and capacitor 95 is a relatively long time constant circuit, and the circuit comprising resistor 92, capacitor 95, and diode 85 is a relatively short time constant circuit. Therefore, during part of the portion of each cycle when the juncture of resistors 92 and 93 is positive with respect to cathode 87 of the diode 85, diode 85 will conduct and capacitor 95 will charge to substantially the peak value of the A. C. voltage appearing across resistor 92. During the remainder of each cycle, capacitor 95 will discharge through the long time constant circuit, comprising resistors 92 and 94 and capacitor 95, and will thus hold the shield grids 90 and 91 negative with respect to the cathodes 62 and 63. The time constants of the circuit may be so adjusted that the shield grids will be biased negatively at all times except when the voltage across resistor 92 is near its positive maximum, at which time anodes 75 and 77 of discharge devices 52 and 54 are also near their positive maximum values. Thus, gas-filled electron discharge devices 52 and 54 tend to remain cut off except for a brief portion of each cycle when their anodes are at or near their positive maximum values. In this manner, positive control of the time of firing of the gas-filled electron discharge devices is assured.

Power may be supplied to the circuit from a standard 60-cycle alternating current power line 96 connected through a switch 97 to the primary winding 98 of transformer 68. The operating winding of time delay relay 84, through whose contacts the anodes of gas-filled electron discharge devices 52 and 54 are connected, as previously described, may be connected in parallel with primary winding 98 of the transformer. A conventional rectifier supplies anode voltage to electron discharge devices 17 and 22, and comprises an electron discharge device 101 of the full-wave rectifier type, which has two anodes and a cathode and is connected in the usual manner between secondary windings 102 and 103 of transformer 68. The D. C. voltage output of the rectifier is filtered by a conventional filter 104 before being supplied to the anodes of electron discharge devices 17 and 22.

The operation of the circuit can best be understood by referring to Figs. 2 through 2g, which show various voltage and current relationships throughout the circuit, when the input signals differ in phase by various amounts. It is assumed for purposes of illustration that the input signals and the values of the various circuit constants are such that signals of equal amplitude appear across resistors 42 and 43 and on the anode of discharge device 31. However, if the signal appearing on the anode of the triode 31 is not equal to the signals across resistors 42 and 43, the basic operation of the circuit will be unchanged. Looking first at Fig. 2, which shows the condition of the circuit when signals A and B are in phase with each other, it is seen that when a sine wave input signal A is impressed on the control grids of triode discharge devices 17 and 22, the signals appearing at anodes 18 and 23 of these discharge devices are substantially square waves of opposite phase. Of course, these square wave signals also appear on anodes 35 and 37 of diode discharge devices 36 and 38. When signal B is in phase with signal A, as shown in Fig. 2, a square wave signal appears on anode 32 of triode discharge device 31, which is in phase with that signal appearing on anode 18 of triode discharge device 17 and on anode 35 of diode discharge device 36. The square wave signal derived from signal B appears on cathodes 40 and 41 of diode discharge devices 36 and 38. As is well-known, an electron discharge device of the diode type will conduct only when its anode is positive with respect to its cathode. Therefore, it is apparent that when signals A and B are in phase with each other, diode 36 will never conduct, because the signals appearing on its anode and cathode are of equal amplitude and agree in phase, and, at no time is anode 35 positive with respect to cathode 40.

However, the signals appearing on anode 37 and cathode 41 of diode discharge device 38 are 180° out-of-phase with each other, and, therefore, during one-half of each cycle, when anode 37 is positive and cathode 41 is negative, diode 38 will conduct. Thus, there will be a voltage drop across resistor 43, and this D. C. voltage will be filtered and applied to control grid 53 of gas-filled electron discharge device 54. In this instance, when diode 36 has not conducted and no D. C. voltage has been developed across resistor 42, equal signals will appear across grid resistors 55 and 56 in the input circuits to discharge devices 52 and 54 which cause control grid 53 to become positive and control grid 51 to become negative with respect to the common cathode connection of the two discharge devices. Thus, discharge device 52 will not be permitted to fire, because its grid voltage is lower than its cathode voltage, but discharge device 54 will be permitted to fire because its grid is positive with respect to its cathode. When the alternating potential impressed on anode 77 of discharge device 54 becomes sufficiently positive, and the negative potential impressed on shield grid 91 by the action of capacitor 95 nears zero, gas-filled electron discharge device 54 will fire and cause current to flow through the operating winding of relay 78 in its anode circuit. Because the anode of discharge device 54 is connected to an A. C. voltage source, the device will not conduct continuously, and as its anode potential decreases toward zero and its cathode potential becomes less negative with respect thereto, it will cease to conduct. However, capacitor 81, which is connected across operating winding 78a, serves to keep operating winding 78a continuously energized, even though discharge device 54 conducts for only approximately one-quarter cycle. Thus, the relay 78 controlled by operating winding 78a will close, while that controlled by operating winding 76 will remain open.

Consider now the case when signal B leads signal A by 60° in phase, which is illustrated by Fig. 2a. For purposes of illustration and description, in all of the examples shown, Signal A has been assumed to be the reference signal and has been shown in the same position with respect to time. It is to be understood, however, that the operation of the circuit is exactly the same whether signal A is of a fixed phase and signal B of varying phase, or whether the phase of signal B is fixed and the phase of signal A variable. This will become apparent as the various examples are considered hereafter.

The signals appearing on anodes 35 and 37 of diodes 36 and 38 are substantially square waves of opposite phase, as in the example previously discussed. However, when there is a 60° phase difference between signals A and B, the square wave signal appearing on anode 32 of discharge device 31, and hence the signal appearing on cathodes 40 and 41 of diodes 36 and 38, will be displaced in phase by 60° from the square wave signal appearing on anode 35 of discharge device 36, and displaced in phase by 120° from the square wave appearing on anode 37 of diode 38. Thus, as clearly seen in Fig. 2a, anode 35 of discharge device 36 will be positive with respect to cathode 40 of the discharge device only during approximately one-sixth of each cycle, and so discharge device 36 will conduct only for approximately one-sixth of each cycle. It is also apparent that anode 37 of discharge device 38 will be positive with respect to its cathode 41 during approximately one-third of each cycle, and, discharge device 38 will conduct during approximately one-third of each cycle. Therefore, because discharge device 38 has conducted for approximately one-third of each cycle, and discharge device 36 has conducted only for approximately one-sixth of each cycle, the voltage appearing at the output of filter 45 will be approximately twice that appearing at the output of filter 44. Thus, there will be a voltage drop across grid resistors 55 and 56 which will again make control grid 53 positive and control grid 51 negative with respect to the common cathode grid 51 negative with respect to the common cathode connection of the discharge devices, although the amplitudes of these positive and negative voltages will not be as great as was the case when the input signals were in phase agreement. Discharge device 54 again will conduct, while discharge device 52 is cut off, and thus, the relay 78 controlled by operating winding 78a will again be actuated.

Let us consider now the case when the phase difference between signals A and B is 90°, which is illustrated in Fig. 2b, and which, in the particular embodiment of the invention illustrated, is taken as the reference phase difference. In this case, the square waves appearing on anode 35 and cathode 40 of discharge device 36 are 90° out-of-phase with each other, and it is apparent that diode 36 will conduct during approximately one-quarter of each cycle. Similarly, the square waves appearing on cathode 41 and anode 37 of diode 38 are 90° out-of-phase with each other and diode 38 will conduct during approximately one-quarter of each cycle. Thus, equal positive voltages will appear at the outputs of the filters 44 and 45, and there will be no voltage drop across grid resistors 55 and 56. Thus, neither control grid 51 nor control grid 53 will be positive with respect to cathodes 62 and 63, and neither discharge device 52 or 54 will conduct; neither of relay operating windings 76a or 78a will be energized, and neither of the relays will close. Thus, it is apparent that when there is a 90° phase difference between input signals A and B, they have attained the reference or desired phase relationship.

It is apparent from the examples thus far considered that when the phase difference between the input signals is less than 90°, relay operating winding 78a is energized. Therefore, it follows that when the pase difference between the input signals is greater than 90°, relay operating winding 76a should be energized. It is seen from Figs. 2c, 2d, and 2e that this effect does occur. Looking first at Fig. 2c, which shows the conditions throughout the circuit when the phase difference between signals A and B is 150°, it is seen that the square wave on anode 35 of diode 36 is displaced in phase by 150° from the square wave appearing on cathode 40 of the device. Thus, anode 35 is positive with respect to cathode 40 for approximately five-twelfths of the cycle, and, therefore, diode 36 will conduct for five-twelfths of each cycle. On the other hand, the square wave impressed on anode 37 of discharge device 38 is only 30° out-of-phase with the square wave impressed on cathode 41 of the discharge device, and, therefore, diode 38 will conduct for only approximately one-twelfth of each cycle. Thus, the voltage built up across the filter 44 of diode 36 will be approximately five times as large as that built up across the filter 45 of diode 38. The current flow through grid resistors 55 and 56, in this case, will make control grid 51 positive and control grid 53 negative with respect to the common cathode connection of the discharge devices 52 and 54. Thus, discharge device 52 will conduct during approximately one-quarter of each cycle of its plate voltage, but discharge device 54 will remain cut off. So long as discharge device 52 conducts during each cycle, relay operating winding 76a, will remain energized because of capacitor 80 connected across the operating winding.

Looking now at that case illustrated by Fig. 2d, when the input signals are phase displaced by 180°, it is seen that the square waves impressed on anode 35 and cathode 40 of diode discharge device 36 are 180° out-of-phase with each other, and, therefore, diode 36 will conduct during one-half of each cycle. However, the square waves impressed on anode 37 and cathode 41 of diode discharge device 38 are exactly in phase with each other, and, therefore, anode 37 will never be positive with respect to cathode 41 and diode 38 will not conduct. Thus, the signals appearing across grid resistors 55 and 56 make control grid 51 positive and control grid 53 negative with respect to the common cathode connection of the discharge devices 52 and 54, and discharge device 52 will conduct during each cycle while discharge device 54 will remain cut off. Thus, again, relay operating winding 76a will be energized and relay operating winding 78a will be de-energized.

It is now apparent that as the phase difference between input signals A and B decreases from 90° toward zero, the D. C. voltage applied to control grid 53 of discharge device 54 becomes more positive with respect to its cathode, and the voltage applied to control grid 51 of discharge device 52 becomes more negative with respect to its cathode, until the positive and negative grid voltages reach their maximum values, when the phase difference between the input signals is zero. Similarly, as the phase difference between the input signals increases above 90°, control grid 51 becomes more positive and control grid 53 becomes more negative with respect to their common cathode connections, until the maximum positive and negative voltages are reached when the input signals are displaced in phase by 180° as shown in Fig. 2d. As the phase difference increases above 180°, the voltage differences between control grids 51 and 53 decreases, but control grid 51 still remains positive and control grid 53 remains negative until the signals are phase displaced by 270° as seen in Fig. 2f. A phase displacement of 270° is the equivalent of a phase displacement of 90°, and is a reference point. At this point, diodes 36 and 38 conduct for equal portions of each cycle and neither gas-filled electron discharge device 52 nor 54 conducts. As the phase difference between the signals continues to increase to 300°, as shown in Fig. 2g, the relationships are such as to cause discharge device 54 to conduct, as in the examples previously discussed, when the phase difference is less than 90°. Thus, it is seen that when the phase difference between the signals is greater than 90°, relay operating winding 76a is energized, and when the phase difference between the signals is less than 90° relay operating winding 78 is energized. In practice, the fact that there is a second reference point at a phase displacement of 270° is of little importance, because, when the circuit is used in a typical application in a servomechanism, any phase displacement from the 90° reference value will cause one of the relays to be actuated. This, in turn, may energize a reversible motor or other device which will tend to correct the phase displacement and return it to its 90° reference point.

It was previously mentioned that a bias voltage is applied to control grids 51 and 53 of discharge devices 52 and 54 from the movable contact pick-off arm 74 of potentiometer 72. By adjusting the contact pick-off arm 74 and thereby varying the negative bias supplied to control grids 51 and 53, the "dead-band" of the circuit may be adjusted. That is, when pick-off contact arm 74 is so set that a large negative bias is applied to control grids 51 and 53 of discharge devices 52 and 54, the positive signal appearing at either of the control grids in response to a phase displacement between the input signals from the 90° reference point, must exceed a certain amount in order to overcome this negative bias. Stating it another way, by adjusting movable contact pick-off arm 74, the circuit may be made unresponsive to phase deviations between the input signals of less than a certain amount. If the negative bias applied to control grids 51 and 53 is small, the circuit becomes quite sensitive and will respond to very small phase differences from the reference point. The dead band adjustment, of course, depends on the application to which the circuit is put.

The following table of values of circuit elements, which have been found to be satisfactory, are cited as exemplary only, and it is understood that the invention is not limited to the use of these particular values for the various elements:

| Element | Value |
| --- | --- |
| Resistor 14 | 1 megohm. |
| Resistor 15 | 1 megohm. |
| Triodes 17 and 22 | Type 6201. |
| Resistor 25 | 100 kilohms. |
| Resistor 26 | 100 kilohms. |
| Resistor 27 | 1 megohm. |
| Resistor 28 | 1 megohm. |
| Triode 31 | Type 6201. |
| Resistor 34 | 100 kilohms. |
| Diodes 36 and 38 | Type 5726. |
| Resistor 42 | 1 megohm. |
| Resistor 43 | 1 megohm. |
| Discharge device 52 | Type 5727. |
| Discharge device 54 | Type 5727. |
| Resistor 55 | 3.3 megohms. |
| Resistor 56 | 3.3 megohms. |
| Resistor 57 | 3.3 megohms. |
| Resistor 58 | 3.3 megohms. |
| Capacitor 60 | .0005µf. |
| Capacitor 61 | .0005µf. |
| Diodes 64 and 85 | Type 5726. |
| Resistor 65 | 22 kilohms. |
| Resistor 66 | 22 kilohms. |
| Potentiometer 72 | 10 kilohms. |
| Capacitor 73 | 4µf. |
| Capacitor 80 | 1µf. |
| Capacitor 81 | 1µf. |
| Resistor 82 | 500 ohms. |
| Resistor 88 | 100 kilohms. |
| Resistor 92 | 10 kilohms. |
| Resistor 93 | 270 kilohms. |
| Resistor 94 | 3.3 megohms. |
| Capacitor 95 | 0.5µf. |
| Rectifier 101 | Type 6087. |

It is now apparent that we have provided a circuit which fulfills the objects of the invention, and fills a need in the art. It is apparent that many changes and modifications may be made by one skilled in the art, which remain within the spirit of the invention, and it is intended to be limited only by the scope of the appended claims.

What I claim as new and desire to secure by Letters Patent of the United States is:

1. A phase comparator comprising means for comparing the phases of two input signals and producing two direct current output signals whose relative amplitudes are related to the phase difference between said input signals, means for producing a positive voltage and a negative voltage whose relative polarities depend upon the relative amplitudes of said direct current output signals, two output circuits each comprising a gas-filled electron discharge device having a control grid and an anode, means connecting said positive voltage to a control grid and connecting said negative voltage to the other control grid, means for supplying an alternating voltage to the anodes of said electron discharge devices, and means for restricting current flow through said electron discharge devices to the period when said anodes are at approximately their maximum positive voltage.

2. A phase comparator comprising means for comparing the phases of two input signals and producing two direct current output signals whose relative amplitudes are related to the phase difference between said input signals, means for producing a positive voltage and a negative voltage whose relative polarities depend upon the relative amplitudes of said direct current output signals, two output circuits each comprising a gas-filled electron discharge device having an anode, a control grid and a shield grid, means connecting said positive voltage to one control grid and connecting said negative voltage to the other control grid, means for supplying an alternating voltage to the anodes of said electron discharge devices, and means for providing a negative voltage on the shield grids of said electron discharge devices to restrict current flow through said devices to the period when said anodes are near their maximum positive values.

3. A phase comparator comprising means for converting two input signals into substantially square waves, means for comparing the phases of said square waves and producing two direct current output signals whose relative amplitudes are related to the phase difference between said square waves, means for producing a positive voltage and a negative voltage whose relative polarities depend upon the relative amplitudes of said direct current output signals, two output circuits each comprising a gas-filled electron discharge device having an anode, a control grid and a shield grid, means connecting said positive voltage to one control grid and connecting said negative voltage to the other control grid, means for supplying an alternating voltage to the anodes of said electron discharge devices, and means for providing a negative voltage on the shield grids of said electron discharge devices to restrict current flow through said devices to the period when said anodes are near their maximum positive values.

4. In combination, a gas-filled electron discharge device having an anode and a shield grid, means for supplying an alternating voltage to said anode, a short time constant circuit connected to said shield grid for placing a negative charge thereon, and a long time constant circuit connected to said shield grid for removing said negative charge therefrom, said short and long time constant circuits acting to restrict current flow through said gas-filled discharge device to the period when its anode is near its maximum positive value.

5. In combination, a gas-filled electron discharge device having an anode, a cathode and a shield grid, a source of alternating voltage, means for supplying said alternating voltage to said anode, a short time constant circuit connected between said source of alternating voltage, said shield grid and said cathode for placing a negative charge on said shield grid relative to said cathode, and a long time constant circuit connected to said shield grid and said cathode for removing said negative charge from said shield grid, said short and long time constant circuits acting to restrict current flow through said gas-filled discharge device to the period when its anode is near its maximum positive value.

6. In combination, a gas-filled electron discharge device having an anode, a cathode and a shield grid, a source of alternating voltage, means for supplying said alternating voltage to said anode, a diode discharge device connected between said shield grid and said cathode and connected to said source of alternating voltage, said diode forming part of a short time constant circuit for placing a negative charge on said shield grid relative to said cathode, and a long time constant circuit connected to said shield grid and said cathode for removing said negative charge from said shield grid, said short and long time constant circuits acting to restrict current flow through said gas-filled discharge device to the period when its anode is near its maximum positive value.

7. In combination, a gas-filled electron discharge device having an anode, a cathode and a shield grid, a source of alternating voltage, means for supplying said alternating voltage to said anode, a diode discharge device having its anode connected to said shield grid and its cathode connected to said cathode of said gas-filled discharge device, a capacitor connected in series between said source of alternating voltage and the anode of said diode discharge device, a first resistor connecting the cathodes of said gas-filled discharge device and said diode discharge device to the side of said capacitor adjacent said source of alternating voltage, said capacitor and said diode discharge device comprising a short time constant circuit for placing a negative charge on said shield grid relative to said cathode of said gas-filled discharge device, a second resistor connected across said diode discharge device, said first and second resistors and said capacitor comprising a long time constant circuit for removing said negative charge from said shield grid, said short and long time constant circuits acting to restrict current flow through said gas-filled discharge device to the period when its anode is near its maximum positive value.

References Cited in the file of this patent

UNITED STATES PATENTS

| | | |
|---|---|---|
| 2,557,581 | Triman | June 19, 1951 |
| 2,558,100 | Rambo | June 26, 1951 |
| 2,577,668 | Wilmotte et al. | Dec. 4, 1951 |
| 2,579,001 | Jeffers | Dec. 18, 1951 |
| 2,587,555 | Weiss | Feb. 26, 1952 |
| 2,611,887 | Lobosco | Sept. 23, 1952 |
| 2,631,279 | Bollinger et al. | Mar. 10, 1953 |